US011687339B2

(12) United States Patent
Liu et al.

(10) Patent No.: US 11,687,339 B2
(45) Date of Patent: Jun. 27, 2023

(54) DATA PROCESSING METHOD AND APPARATUS, AND RELATED PRODUCT

(71) Applicant: CAMBRICON TECHNOLOGIES CORPORATION LIMITED, Beijing (CN)

(72) Inventors: Shaoli Liu, Beijing (CN); Bingrui Wang, Beijing (CN); Zhen Li, Beijing (CN); Jun Liang, Beijing (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 0 days.

(21) Appl. No.: 17/327,627

(22) Filed: May 21, 2021

(65) Prior Publication Data

US 2021/0334105 A1 Oct. 28, 2021

Related U.S. Application Data (63) Continuation of application No. PCT/CN2020/082775, filed on Apr. 1, 2020.

(30) Foreign Application Priority Data

Apr. 19, 2019 (CN) .......................... 201910320091.X (51) Int. Cl.
*G06F 15/80* (2006.01)
*G06F 15/173* (2006.01)
(Continued)

(52) U.S. Cl.
CPC ...... *G06F 9/30181* (2013.01); *G06F 13/1668* (2013.01)

(58) Field of Classification Search
None
See application file for complete search history.

(56) References Cited

U.S. PATENT DOCUMENTS

2004/0221294 A1* 11/2004 Kalmuk ................. G06F 9/544
719/312
2009/0198938 A1 8/2009 Arimilli et al.
(Continued)

FOREIGN PATENT DOCUMENTS

CN 1588300 A 3/2005
CN 107077327 A 8/2017
(Continued)

OTHER PUBLICATIONS

International Search Report issued in corresponding International Application No. PCT/CN2020/082775, dated Jun. 30, 2019, 4 pages.
(Continued)

*Primary Examiner* — Hyun Nam
(74) *Attorney, Agent, or Firm* — Bayes PLLC (57) ABSTRACT

The present disclosure provides a data processing method and an apparatus and a related product. The products include a control module including an instruction caching unit, an instruction processing unit, and a storage queue unit. The instruction caching unit is configured to store computation instructions associated with an artificial neural network operation; the instruction processing unit is configured to parse the computation instructions to obtain a plurality of operation instructions; and the storage queue unit is configured to store an instruction queue, where the instruction queue includes a plurality of operation instructions or computation instructions to be executed in the sequence of the queue. By utilizing the above-mentioned method, the present disclosure can improve the operation efficiency of related products when performing operations of a neural network model.

20 Claims, 3 Drawing Sheets

(51) Int. Cl.
    *G06F 9/30*         (2018.01)
    *G06F 13/16*       (2006.01)

(56) References Cited

U.S. PATENT DOCUMENTS

| | | | |
|---|---|---|---|
| 2010/0325395 | A1 | 12/2010 | Burger et al. |
| 2014/0095619 | A1* | 4/2014 | Dozier ............... G06Q 10/06 709/204 |
| 2016/0246599 | A1* | 8/2016 | Johnson ............... G06F 9/3016 |
| 2018/0034892 | A1* | 2/2018 | Olsen ............... G06F 16/17 |
| 2018/0285718 | A1 | 10/2018 | Baum et al. |
| 2018/0314946 | A1 | 11/2018 | Bajic et al. |
| 2019/0042401 | A1 | 2/2019 | Khan et al. |
| 2019/0042940 | A1 | 2/2019 | Sakairi et al. |
| 2019/0050717 | A1* | 2/2019 | Temam ............... G06F 17/16 |
| 2020/0242264 | A1* | 7/2020 | Hajnoczi ............ G06F 12/0804 |
| 2021/0334105 | A1* | 10/2021 | Liu ............... G06F 9/3881 |
| 2022/0405101 | A1* | 12/2022 | AlBarakat ............ G06F 9/3887 |
| 2023/0004365 | A1* | 1/2023 | Hanebutte ............ G06F 8/44 |
| 2023/0039454 | A1* | 2/2023 | Wang ............... G05B 19/4069 |
| 2023/0039892 | A1* | 2/2023 | Zhang ............... G06F 7/50 |

FOREIGN PATENT DOCUMENTS

| | | |
|---|---|---|
| CN | 107347253 A | 11/2017 |
| CN | 108364065 A | 8/2018 |
| CN | 109446147 A | 3/2019 |
| CN | 109522052 A | 3/2019 |
| CN | 109543832 | 3/2019 |
| CN | 109543832 A | 3/2019 |
| CN | 109603149 A | 4/2019 |
| CN | 111782133 A | 10/2020 |
| EP | 1228426 B1 | 12/2005 |
| JP | 63311450 A | 12/1988 |
| JP | 0353320 A | 3/1991 |
| JP | 11-85969 A | 3/1999 |
| JP | 1185969 A | 3/1999 |
| JP | 2003330773 A | 11/2003 |
| JP | 2004295195 A | 10/2004 |
| JP | 4355878 B2 | 8/2009 |
| WO | 2016040666 A1 | 3/2016 |
| WO | 2018125250 A1 | 7/2018 |
| WO | 2018217360 A1 | 11/2018 |

OTHER PUBLICATIONS

Night Li, "CUDNN study notes (2)", https://yq.aliyun.com/articles/497075,(Feb. 26, 2018).
Extended European Search Report issued in related European Application No. 20217328.2, dated Apr. 26, 2021, 6 pages.
Extended European Search Report issued in related European Application No. 20217329.0, dated Apr. 22, 2021, 6 pages.
Extended European Search Report issued in related European Application No. 20217330.8, dated Apr. 20, 2021, 9 pages.
Extended European Search Report issued in related European Application No. 20217331.6, dated Apr. 28, 2021, 6 pages.
Extended European Search Report issued in related European Application No. 20217332.4, dated Apr. 30, 2021, 6 pages.
Extended European Search Report issued in related European Application No. 20217333.2, dated Apr. 20, 2021, 12 pages.
First Office Action issued in related Chinese Application No. 201910272411.9, dated May 21, 2021, 19 pages.
Office action issued in related Japanese Application No. 2021-510522, dated Oct. 19, 2021, 3 pages.
Second Office Action in corresponding Chinese Application No. 201910272411.9 dated Jan. 21, 2022 (12 pages).
First Office Action in corresponding Chinese Application No. 201910319165.8 dated Apr. 28, 2022 (11 pages).
CUDNN https://developer.aliyun.201 80226 dated Feb. 26, 2018 (5 pages).
Office Action in corresponding Chinese Application No. 201910320091.X dated May 10, 2022 (14 pages).
Extended European Search Report in corresponding European Application No. 20217328.2 dated Feb. 23, 2022 (4 pages).
Extended European Search Report in corresponding European Application No. 20783678.4 dated Feb. 22, 2022 (8 pages).
Japanese Office Action in corresponding Japanese Application No. 2020-198079 dated Feb. 1, 2022 (4 pages).
Japanese Office Action in corresponding Japanese Application No. 2020-198102 dated Jan. 18, 2022 (2 pages).
Japanese Office Action in corresponding Japanese Application No. 2020-198158 dated Jan. 25, 2022 (3 pages).
Japanese Office Action in corresponding Japanese Application No. 2020-198177 dated Feb. 1, 2022 (3 pages).
Notification of Reason for Refusal from corresponding Korean Application No. 10-2020-7036505 dated Feb. 28, 2022 (6 pages).
Notification of Reason for Refusal from corresponding Korean Application No. 10-2020-7036500 dated Feb. 28, 2022 (6 pages).
Notification of Reason for Refusal from corresponding Korean Application No. 10-2020-7036496 dated Feb. 23, 2022 (5 pages).
Notification of Reason for Refusal from corresponding Korean Application No. 10-2020-7036494 dated Feb. 23, 2022 (6 pages).
Notification of Reason for Refusal from corresponding Korean Application No. 10-2020-7036492 dated Feb. 23, 2022 (6 pages).
Notice of Rejection in related Japanese Application No. 2020-198021 dated Jul. 12, 2022 (3 pages).
Pick Up!, Robocon Magazine, No. 63, Japan, Ohmsha Co., Ltd., dated Apr. 15, 2009 (6 pages).
Anonymous: "Hazard (computer architecture)", Nov. 17, 2018 (Nov. 17, 2018), pp. 1-6, XP055983121, Retrieved from the Internet: URL:https://en.wikipedia.org/w/index.php? title=Hazard_(computer_architecture)&oldid=869291146 [retrieved on Nov. 18, 2022].
Office Action in related European Application No. 20783678.4 dated Nov. 11, 2022 (11 pages).
Office Action in related European Application No. 20217333.2 dated Mar. 27, 2023 (6 pages).

* cited by examiner

DATA PROCESSING METHOD AND APPARATUS, AND RELATED PRODUCT

CROSS-REFERENCE TO RELATED APPLICATIONS

This is a bypass continuation application of PCT Application No. PCT/CN2020/082775 filed Apr. 1, 2020, which claims benefit of priority to Chinese Application No. 201910272411.9 filed Apr. 4, 2019, Chinese Application No. 201910272625.6 filed Apr. 4, 2019, Chinese Application No. 201910320091.X filed Apr. 19, 2019, Chinese Application No. 201910340177.9 filed Apr. 25, 2019, Chinese Application No. 201910319165.8 filed Apr. 19, 2019, Chinese Application No. 201910272660.8 filed Apr. 4, 2019, and Chinese Application No. 201910341003.4 filed Apr. 25, 2019. The contents of all these applications are incorporated herein in their entireties.

TECHNICAL FIELD

The disclosure relates generally to the field of computer technologies, and more specifically to a data processing method and an apparatus and related products.

BACKGROUND

With the continuous development of the AI (Artificial Intelligence) technology, it has gradually obtained wide application and worked well in the fields of image recognition, speech recognition, and natural language processing, and the like. However, as the complexity of AI algorithms is growing, the amount of data and data dimensions that need to be processed are increasing. In related arts, processors usually have to first determine data address based on parameters specified in data-read instructions, before reading the data from the data address. In order to generate the read and save instructions for the processor to access data, programmers need to set relevant parameters for data access (such as the relationship between different data, or between different dimensions of a data, etc.) when designing parameters. The above-mentioned method reduces the processing efficiency of the processors.

SUMMARY

The present disclosure provides a technical solution for data synchronization.

A first aspect of the present disclosure provides a data synchronization method applied to a first processor, and the method includes:

generating, by the first processor, a descriptor synchronization instruction according to a descriptor of tensor data to be synchronized, wherein the descriptor indicates a shape of the tensor data to be synchronized, and the descriptor synchronization instruction includes an identifier of the descriptor or content of the descriptor; and sending the descriptor synchronization instruction to a second processor, wherein the descriptor synchronization instruction is configured to instruct the second processor to obtain the tensor data to be synchronized according to the descriptor synchronization instruction.

A second aspect of the present disclosure provides a data synchronization method applied to a second processor, and the method includes:

parsing a descriptor synchronization instruction received from a first processor to obtain a descriptor of tensor data to be synchronized, wherein the descriptor synchronization instruction includes an identifier of the descriptor or content of the descriptor, and the descriptor indicates a shape of the tensor data to be synchronized; and obtaining the tensor data to be synchronized according to the descriptor of the tensor data to be synchronized.

A third aspect of the present disclosure provides a data synchronization method applied to a second processor, and the method includes:

determining that there is tensor data to be synchronized;

generating a descriptor synchronization request instruction, wherein the descriptor synchronization request instruction is used to instruct a first processor to send a descriptor of the tensor data to be synchronized according to the descriptor synchronization request instruction, and the descriptor indicates a shape of the tensor data to be synchronized; and sending the descriptor synchronization request instruction to the first processor.

A fourth aspect of the present disclosure provides a data synchronization apparatus applied to a first processor, and the apparatus includes:

a synchronization instruction generating module configured to generate a descriptor synchronization instruction according to a descriptor of tensor data to be synchronized, where the descriptor indicates a shape of the tensor data to be synchronized, and the descriptor synchronization instruction includes an identifier of the descriptor or content of the descriptor; and a synchronization instruction sending module configured to send the descriptor synchronization instruction to a second processor, wherein the descriptor synchronization instruction is configured to instruct the second processor to obtain the tensor data to be synchronized according to the descriptor synchronization instruction.

A fifth aspect of the present disclosure provides a data synchronization apparatus applied to a second processor, and the apparatus includes:

a first parsing module configured to parse a descriptor synchronization instruction received from a first processor to obtain a descriptor of tensor data to be synchronized, wherein the descriptor synchronization instruction includes an identifier of the descriptor or content of the descriptor, and the descriptor indicates a shape of the tensor data to be synchronized; and a first data obtaining module configured to obtain the tensor data to be synchronized according to the descriptor of the tensor data to be synchronized.

A sixth aspect of the present disclosure provides a data synchronization apparatus applied to a second processor, and the apparatus includes:

a request instruction generating module configured to determine that there is tensor data to be synchronized, and generate a descriptor synchronization request instruction, wherein the descriptor synchronization request instruction is used to instruct a first processor to send a descriptor of the tensor data to be synchronized according to the descriptor synchronization request instruction, and the descriptor indicates a shape of the tensor data to be synchronized; and a request instruction sending module configured to send the descriptor synchronization request instruction to the first processor.

A seventh aspect of the present disclosure provides an artificial intelligence chip including the abovementioned data synchronization apparatus.

An eighth aspect of the present disclosure provides an electronic device including the abovementioned artificial intelligence chip.

A ninth aspect of the present disclosure provides a board card including a storage device, an interface apparatus, a control device, and the abovementioned artificial intelligence chip. The artificial intelligence chip is connected to the storage device, the control device, and the interface apparatus, respectively. The storage device is configured to store data. The interface apparatus is configured to implement data transmission between the artificial intelligence chip and an external equipment. The control device is configured to monitor state of the artificial intelligence chip.

According to the data synchronization method provided in the embodiment of the present disclosure, when data needs to be synchronized, by setting a descriptor indicating the shape of tensor data, a descriptor synchronization instruction may be obtained according to a descriptor of tensor data to be synchronized and send to a second processor to instruct the second processor to obtain the tensor data to be synchronized according to the descriptor synchronization instruction, thereby reducing synchronization overhead, reducing the complexity of data synchronization, and improving the efficiency of data synchronization.

In order to make other features and aspects of the present disclosure clearer, a detailed description of exemplary embodiments with reference to the drawings is provided below.

BRIEF DESCRIPTION OF THE DRAWINGS

The accompanying drawings contained in and forming part of the specification together with the specification show exemplary embodiments, features and aspects of the present disclosure and are used to explain the principles of the disclosure.

DETAILED DESCRIPTIONS

Various exemplary embodiments, features, and aspects of the present disclosure will be described in detail below with reference to the drawings. The same labels in the drawings represent the same or similar elements. Although various aspects of the embodiments are shown in the drawings, the drawings are not necessarily drawn to scale unless specifically noted.

The "exemplary" as used herein means "serving as an example, embodiment, or illustration." Any embodiment described herein as "exemplary" is not necessarily to be interpreted as superior to or better than other embodiments.

In addition, various specific details are provided for better illustration and description of the present disclosure. Those skilled in the art should understand that the present disclosure can be implemented without certain specific details. In some embodiments, methods, means, components, and circuits that are well known to those skilled in the art have not been described in detail in order to highlight the main idea of the present disclosure.

Figure 1:
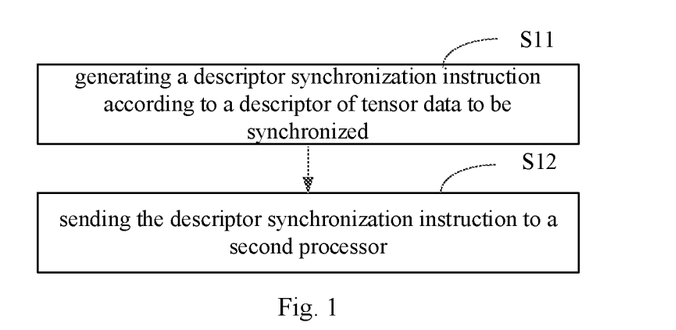
FIG. 1 shows a flowchart of a data synchronization method according to an embodiment of the present disclosure.

An embodiment of the present disclosure provides a data synchronization method. FIG. 1 shows a flowchart of a data synchronization method according to an embodiment of the present disclosure. The data synchronization method can be applied to a first processor, where the first processor may include a general-purpose processor (such as a CPU (central processing unit), a GPU (graphics processor)) and a dedicated processor (such as an AI processor, a scientific computing processor, or a digital signal processor, etc.). This disclosure does not limit the type of the first processor.

As shown in FIG. 1, the data synchronization method includes:

in a step S11, generating a descriptor synchronization instruction according to a descriptor of tensor data to be synchronized, where the descriptor synchronization instruction includes an identifier of the descriptor and/or content of the descriptor, and the descriptor is used to indicate a shape of the tensor data to be synchronized; and in a step S12, sending the descriptor synchronization instruction to a second processor, where the descriptor synchronization instruction is used to instruct the second processor to obtain the tensor data to be synchronized according to the descriptor synchronization instruction.

For example, the tensor data to be synchronized may include N-dimensional tensor data (N is an integer greater than or equal to 0, for example, N=1, 2, or 3), where the tensor may have various forms of data composition, and the tensor may have different dimensions, for example, a scalar can be viewed as a 0-dimensional tensor, a vector can be viewed as a 1-dimensional tensor, and a matrix can be a tensor of two or more dimensions. The shape of a tensor includes dimensions of the tensor and a size of each dimension of each tensor and the like. For example, the shape of a tensor:

$$\begin{bmatrix} 1 & 2 & 3 & 4 \\ 11 & 22 & 33 & 44 \end{bmatrix};$$

can be described by the descriptor as (2, 4). In other words, the shape of this 2-dimensional tensor is described by two parameters: the first parameter 2 corresponds to the size of a first dimension (column), and the second parameter 4 corresponds to the size of a second dimension (row). It should be noted that the present disclosure does not limit the manner in which the descriptor indicates the shape of the tensor.

Conventionally, a processing instruction usually includes one or more operands and each operand includes the data address of data on which the processing instruction is to be executed. The data can be tensor data or scalar data. However, the data address only indicates the storage area in a memory where the tensor data is stored. It neither indicates the shape of the tensor data, nor identifies the related information such as the relationship between this tensor data and other tensor data. As a result, the processor is inefficient in accessing tensor data. In the present disclosure, a descriptor (tensor descriptor) is set to indicate the shape of the tensor (N-dimensional tensor data), where the value of N can be determined according to a count of dimensions (orders) of the tensor data, and can also be set according to the usage of the tensor data. For example, when the value of N is 3, the tensor data is 3-dimensional tensor data, and the descriptor can be used to indicate the shape (such as offset, size, etc.) of the 3-dimensional tensor data in three dimensions. It should be understood that those skilled in the art can set the value of N according to actual needs, which is not limited in the present disclosure.

In some embodiments, the descriptor may include an identifier and content. The identifier of the descriptor may be used to distinguish the descriptor from other descriptors. For example, the identifier may be an index. The content of the descriptor may include at least one shape parameter (such as a size of each dimension of the tensor, etc.) representing the shape of the tensor data, and may also include at least one address parameter (such as a base address of a datum point) representing an address of the tensor data. The present disclosure does not limit the specific parameters included in the content of the descriptor. By using the descriptor to indicate the shape of tensor data, related information such as the relationship among a plurality of pieces of tensor data can be determined, so as to improve the access efficiency of tensor data and reduce the complexity of data synchronization.

In some embodiments, during data processing, data synchronization between a plurality of processors (such as a plurality of cores of an artificial intelligence chip) may be executed, for example, an operation result of a processor A1 may be synchronized to a processor A2 as input data of another operation. In this case, a data synchronization mechanism based on the descriptor can be used to achieve data synchronization.

In some embodiments, the first processor is a sender for data synchronization, and the second processor is a receiver for data synchronization. When there is tensor data to be synchronized, in the step S11, the first processor may generate the descriptor synchronization instruction according to the descriptor of the tensor data, and in the step S12, the first processor may send the descriptor synchronization instruction to the second processor to be synchronized. The second processor may include a general-purpose processor (such as a CPU (central processing unit), a GPU (graphics processor)) and a dedicated processor (such as an AI processor, a scientific computing processor, or a digital signal processor, etc.). The type of the second processor may be the same as or different from the type of the first processor, and this disclosure does not limit the type of the second processor.

In some embodiments, the first processor can initiate data synchronization on the second processor. For example, when the first processor completes an operation and obtains an operation result (tensor data), the first processor actively synchronizes data with the second processor that needs to use the operation result. In another example, the first processor may also synchronize data with the second processor in response to a synchronization request of the second processor. For example, when receiving a synchronization request instruction from the second processor, the first processor starts generating data synchronization instructions to cause data synchronization to execute on the second processor. The present disclosure does not limit the timing of the start of data synchronization.

In some embodiments, when the first processor determines that there is tensor data to be synchronized, the first processor may obtain the descriptor of the tensor data. The descriptor may be a registered (created) descriptor indicating the shape of the tensor data, or a new descriptor registered (created) according to the shape parameter of the tensor data. The type of descriptor is not limited in the present disclosure.

In some embodiments, the descriptor synchronization instruction may be generated according to the descriptor of the tensor data, and the descriptor synchronization instruction includes the identifier of the descriptor and/or the content of the descriptor. In some embodiments, if a descriptor indicating the tensor data to be synchronized has been registered in the second processor, the descriptor synchronization instruction may only include the identifier of the descriptor (for example, when the identifier of the descriptor is TR1, the descriptor synchronization instruction is represented as Send TR1) to instruct the second processor to synchronize the tensor data according to the identifier of the descriptor (TR1). In some alternative embodiments, if the descriptor indicating the tensor data to be synchronized is not registered in the second processor, the descriptor synchronization instruction may include the content of the descriptor, or include both the identifier of the descriptor and the content of the descriptor to instruct the second processor to synchronize the tensor data according to the content of the descriptor. The present disclosure does not limit the specific content of the descriptor synchronization instruction.

In some embodiments, after the descriptor synchronization instruction is generated, the descriptor synchronization instruction may be sent to the second processor to instruct the second processor to obtain the tensor data to be synchronized according to the descriptor synchronization instruction. In some embodiments, if the descriptor synchronization instruction includes the identifier of the descriptor, the second processor may obtain the content of the descriptor according to the identifier of the descriptor, and then obtain the tensor data indicated by the descriptor according to the content of the descriptor, thereby synchronizing the tensor data. In some other embodiments, if the descriptor synchronization instruction includes the content of the descriptor, the second processor may directly obtain the tensor data indicated by the descriptor according to the content of the descriptor, thereby synchronizing the tensor data.

According to the data synchronization method provided in the embodiment of the present disclosure, by defining a descriptor indicating the shape of tensor data, when data synchronization is needed, a descriptor synchronization instruction can be generated according to the descriptor of the tensor data to be synchronized and sent to the second processor to instruct the second processor to obtain the tensor data to be synchronized according to the descriptor synchronization instruction, thereby reducing synchronization overhead and the complexity of data synchronization, and improving the efficiency of data synchronization.

In some embodiments, the data synchronization method further includes determining the descriptor of the tensor data to be synchronized according to the descriptor synchronization request instruction received from the second processor.

For example, the first processor may execute data synchronization on the second processor in response to the synchronization request of the second processor. The descriptor synchronization request instruction received from the second processor may include information of the tensor data to be synchronized, such as an identifier indicating the descriptor of the tensor data to be synchronized, data characteristics of the tensor data to be synchronized, and the like, where the data characteristics of the tensor data may include information such as the shape, source, and address of the tensor data. The present disclosure does not limit the specific content of the descriptor synchronization request instruction. According to the information in the descriptor synchronization request instruction, the first processor may determine the descriptor of the tensor data to be synchronized, and then generate the descriptor synchronization instruction.

According to the data synchronization method provided in the present disclosure, the descriptor of the tensor data to be synchronized can be determined according to the synchronization request of the second processor, and included in a descriptor synchronization instruction, thereby avoiding unnecessary data synchronization and improving the efficiency of data synchronization.

In some embodiments, the descriptor synchronization request instruction includes the identifier of the descriptor. The determining the descriptor of the tensor data to be synchronized according to the descriptor synchronization request instruction received from the second processor includes: parsing the descriptor synchronization request instruction to obtain the identifier of the descriptor; and determining the descriptor of the tensor data to be synchronized according to the identifier of the descriptor.

For example, if descriptors indicating the tensor data have been registered in both the first processor and the second processor, and the identifiers of the descriptors registered in the first processor and the second processor are the same or correspond to each other, the descriptor synchronization request instruction may include the identifiers of the descriptors. For example, when an identifier of a descriptor is TR1, the descriptor synchronization request instruction is represented as Receive TR1. The first processor may parse the descriptor synchronization request instruction received from the second processor to obtain the identifier of the descriptor, and then determine the descriptor of the tensor data to be synchronized according to the identifier of the descriptor, and include it in the descriptor synchronization instruction.

According to the data synchronization method provided in the present disclosure, the descriptor of the tensor data to be synchronized can be determined according to the identifier of the descriptor in the request instruction, and used to achieve synchronization of the tensor data, thereby reducing the amount of data transmitted during synchronization and improving processing efficiency.

In some embodiments, the descriptor synchronization request instruction includes data characteristics of the tensor data to be synchronized. The determining the descriptor of the tensor data to be synchronized according to the descriptor synchronization request instruction received from the second processor includes parsing the descriptor synchronization request instruction to obtain the data characteristics of the tensor data to be synchronized; and determining the descriptor of the tensor data to be synchronized according to the data characteristics of the tensor data to be synchronized.

For example, if a descriptor indicating the tensor data has not been registered in the second processor; or a descriptor indicating the tensor data has been registered in the first processor, but the identifier of the descriptor registered in the second processor does not correspond to the identifier of the descriptor registered in the second processor, then the descriptor synchronization request instruction may include the data characteristics of the tensor data to be synchronized. The first processor may parse the descriptor synchronization request instruction received from the second processor to obtain the data characteristics of the tensor data to be synchronized, and then determine the tensor data to be synchronized and its descriptor according to the data characteristics of the tensor data to be synchronized in order to generate the descriptor synchronization instruction.

In some embodiments, the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address range of ADDR0-ADDR127), and the shape of the tensor data may be a specified shape (for example, the tensor data may be a 20*10 two-dimensional tensor). Those skilled in the art can modify the data characteristics of the tensor data to be synchronized according to the actual application, which is not limited in the present disclosure.

In some embodiments, according to the data characteristics, the first processor may find the tensor data to be synchronized, and determine the descriptor of the tensor data to be synchronized. For example, the first processor may directly obtain a descriptor of the tensor data or register a corresponding descriptor. According to the descriptor of the tensor data to be synchronized, the first processor may generate and send a descriptor synchronization instruction to instruct the second processor to synchronize the tensor data.

By utilizing the above-mentioned data synchronization method provided by the present disclosure, the descriptor of the tensor data to be synchronized can be determined according to the data characteristics in the descriptor synchronization request, and synchronization of the tensor data can be achieved. In this way, there is no need to transmit tensor data itself from the first processor to the second processor during synchronization, which reduces the amount of transmitted data and synchronization overhead and improves processing efficiency.

In some embodiments, the descriptor synchronization instruction includes the content of the descriptor of the tensor data to be synchronized. The step S11 may further include when a storage address of the tensor data to be synchronized is in a shared storage space, generating the descriptor synchronization instruction according to the content of the descriptor of the tensor data to be synchronized, to instruct the second processor to obtain the tensor data to be synchronized from the shared storage space according to the content of the descriptor of the tensor data to be synchronized.

For example, a plurality of processors (e.g., a plurality of cores) may have a shared storage space, for example, an off-chip memory that can be accessed by both the first processor and the second processor. The shared storage space may be a storage space in which a plurality of processors (e.g., a plurality of cores) can access data. The shared storage space for processors may be preset, and the present disclosure does not limit the setting method of the shared storage space.

In some embodiments, if the storage address of the tensor data to be synchronized is in the shared storage space, since the second processor may also access data from the shared storage space, the second processor can directly read the tensor data according to the content of the descriptor to synchronize the tensor data. In this case, the descriptor synchronization instruction may include the content of the descriptor of the tensor data to be synchronized, in other words, the descriptor synchronization instruction may be generated according to the content of the descriptor of the tensor data to be synchronized. After receiving the descriptor synchronization instruction, the second processor may parse the instruction to obtain the content of the descriptor. According to the content of the descriptor, the second processor may determine the data address of the tensor data to be synchronized and obtain the tensor data to be synchronized from the shared storage space.

By utilizing the above-mentioned data synchronization method provided by the present disclosure, unnecessary data transmission can be avoided, the amount of transmitted data can be reduced, and the synchronization efficiency can be improved.

In some embodiments, the step S11 may include:

storing the content of the descriptor of the tensor data to be synchronized to a storage space of synchronized data; and generating the descriptor synchronization instruction according to the address of the content of the descriptor in the storage space of synchronized data to instruct the second processor to obtain the content of the descriptor of the tensor data to be synchronized from the storage space of synchronized data.

For example, a plurality of processors (a plurality of cores) may have a storage space of synchronized data that is dedicated to store the synchronized data. The storage space of synchronized data may be the above-mentioned shared storage space, or a part of the shared storage space, or a storage space different from the shared storage space, which is not limited in the present disclosure.

In some embodiments, the storage space of synchronized data may be a storage space in which a plurality of cores (a plurality of processors) can access synchronized data, or a storage space in which part of cores (part of processors) can access synchronized data, which is not limited in the present disclosure.

In some embodiments, after determining the descriptor of the tensor data to be synchronized, the first processor may store the content of the descriptor in the storage space of synchronized data, and generate and send the descriptor synchronization instruction according to the address of the content of the descriptor in the storage space of synchronized data. After receiving the descriptor synchronization instruction, the second processor may parse the instruction to obtain the storage address of the content of the descriptor. According to the storage address, the second processor may obtain the content of the descriptor of the tensor data to be synchronized from the storage space of synchronized data, then determine the data address of the tensor data to be synchronized according to the content of the descriptor, and obtain the tensor data to be synchronized, thereby achieving the entire synchronization process.

By utilizing the above-mentioned data synchronization method provided by the present disclosure, the amount of data transmitted between processors during synchronization can be further reduced, and synchronization efficiency can be improved.

In some embodiments, the step S11 may include:

when the storage address of the tensor data to be synchronized is in a non-shared storage space, storing the tensor data to be synchronized to the shared storage space;

generating the descriptor of the tensor data to be synchronized according to the address of the tensor data to be synchronized in the shared storage space; and generating the descriptor synchronization instruction according to the content of the descriptor of the tensor data to be synchronized, to instruct the second processor to obtain the tensor data to be synchronized from the shared storage space according to the content of the descriptor of the tensor data to be synchronized.

For example, the first processor may have a non-shared storage space in which the first processor may access data, and the second processor cannot access the non-shared storage space of the first processor, so that the second processor cannot access data in the non-shared storage space. If the storage address of the tensor data to be synchronized is in the non-shared storage space, the second processor cannot directly obtain the tensor data. In this case, the first processor may transfer the tensor data to be synchronized and store the tensor data to be synchronized to the shared storage space, so that the second processor can access the tensor data. After the tensor data to be synchronized is transferred and stored into the shared storage space, the first processor may determine whether a descriptor of the tensor data to be synchronized already exists and can be used. In some embodiments, if a descriptor indicating the tensor data in the non-shared storage space is not registered in the first processor, or such a descriptor is registered but cannot be modified (for example, the descriptor is being operated), the first processor may determine no usable descriptor exists and may generate a new descriptor of the tensor data to be synchronized to indicate the new address of the tensor data in the shared storage space.

In some embodiments, after generating the descriptor, the first processor may generate the descriptor synchronization instruction according to the content of the descriptor. After receiving the descriptor synchronization instruction, the second processor may parse the instruction to obtain the content of the descriptor. According to the content of the descriptor, the second processor may determine the data address of the tensor data to be synchronized, and obtain the tensor data to be synchronized from the shared storage space, thereby achieving the entire synchronization process.

By utilizing the above-mentioned data synchronization method provided by the present disclosure, the tensor data to be synchronized in the non-shared storage space can be transferred and stored into the shared storage space, so that the second processor can obtain the tensor data to be synchronized, thereby reducing the amount of data transmitted between processors during synchronization, and improving the synchronization efficiency.

In some embodiments, the step S11 may include:

when the storage address of the tensor data to be synchronized is in the non-shared storage space, storing the tensor data to be synchronized to the shared storage space;

modifying the descriptor of the tensor data to be synchronized in the non-shared storage space according to the new address of the tensor data to be synchronized in the shared storage space; and generating the descriptor synchronization instruction according to the content of the descriptor of the tensor data to be synchronized to instruct the second processor to obtain the tensor data to be synchronized from the shared storage space according to the content of the descriptor of the tensor data to be synchronized.

For example, similar to the above example, if the tensor data to be synchronized is in the non-shared storage space of the first processor, the first processor may transfer the tensor data to be synchronized and store the tensor data to be synchronized into the shared storage space. After the tensor data to be synchronized is transferred and stored into the shared storage space, the first processor may determine whether a descriptor of the tensor data to be synchronized already exists and can be used. In some embodiments, if a descriptor indicating the tensor data in the non-shared storage space has been registered in the first processor and the descriptor can be modified (for example, the descriptor has not being operated), the first processor may modify the existing descriptor rather than generating a new one. For example, the first processor may modify the descriptor of the tensor data to be synchronized to indicate the new address of the tensor data in the shared storage space.

In some embodiments, after modifying the descriptor, the first processor may generate the descriptor synchronization instruction according to the content of the descriptor. After receiving the descriptor synchronization instruction, the second processor may parse the instruction to obtain the content of the descriptor. According to the content of the descriptor, the second processor may determine the data address of the tensor data to be synchronized, and obtain the tensor data to be synchronized from the shared storage space, thereby achieving the entire synchronization process.

By utilizing the above-mentioned data synchronization method provided by the present disclosure, the tensor data to be synchronized in the non-shared storage space can be transferred and stored into the shared storage space, which could reduce the amount of data transmitted between processors during synchronization and improve the synchronization efficiency. In addition, storage space for storing content of descriptors is limited and thus the number of descriptors that can be generated is also limited. Because the first processor does not need to duplicate the descriptor during the synchronization process, the limited descriptor resources can be more efficiently used.

Figure 2:
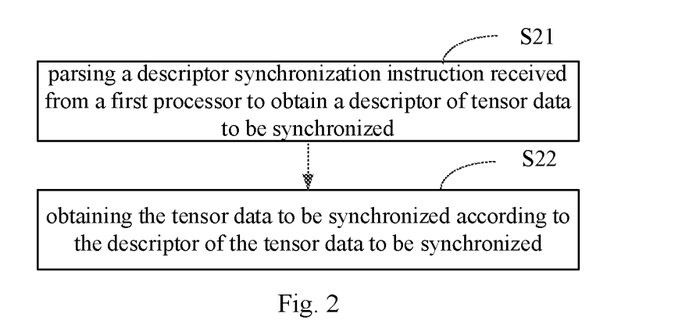
FIG. 2 shows a flowchart of a data synchronization method according to an embodiment of the present disclosure.

FIG. 2 shows a flowchart of a data synchronization method according to an embodiment of the present disclosure. As shown in FIG. 2, the data synchronization method includes:

in a step S21, parsing a descriptor synchronization instruction received from a first processor to obtain a descriptor of tensor data to be synchronized, where the descriptor synchronization instruction includes an identifier of the descriptor and/or content of the descriptor, and the descriptor is used to indicate a shape of the tensor data to be synchronized; and in a step S22, obtaining the tensor data to be synchronized according to the descriptor of the tensor data to be synchronized.

For example, the first processor (sender) can initiate data synchronization on a second processor (receiver). For example, when the first processor completes an operation and obtain an operation result (tensor data), the first processor initiates data synchronization on the second processor that needs to use the operation result.

In some embodiments, when receiving the descriptor synchronization instruction from the first processor, the second processor may parse the descriptor synchronization instruction to obtain the descriptor of the tensor data to be synchronized (such as the identifier of the descriptor and/or content of the descriptor).

In some embodiments, if the descriptor synchronization instruction includes only the identifier of the descriptor, the second processor may internally search for the content of the descriptor corresponding to the identifier of the descriptor, and then obtain the tensor data to be synchronized according to the content of the descriptor.

In some embodiments, if the descriptor synchronization instruction includes the identifier of the descriptor and the content of the descriptor, the second processor may search for a descriptor corresponding to an identifier of a descriptor, and update original content of the descriptor according to the content of the descriptor in the descriptor synchronization instruction. The second processor may further obtain the tensor data to be synchronized according to the updated content of the descriptor.

In some embodiments, if the descriptor synchronization instruction includes the content of the descriptor, the second processor may register a descriptor indicating the tensor data to be synchronized according to the content of the descriptor, and obtain the tensor data to be synchronized according to the content of the descriptor.

According to the data synchronization method provided in the embodiment of the present disclosure, when data needs to be synchronized, by defining a descriptor indicating the shape of tensor data, a descriptor synchronization instruction may be obtained according to a descriptor of tensor data to be synchronized and send to a second processor to instruct the second processor to obtain the tensor data to be synchronized according to the descriptor synchronization instruction, thereby reducing synchronization overhead, reducing the complexity of data synchronization, and improving the efficiency of data synchronization.

In some embodiments, the descriptor synchronization instruction includes the content of the descriptor of the tensor data to be synchronized. The step S22 may include:

obtaining the tensor data to be synchronized from a shared storage space according to the content of the descriptor of the tensor data to be synchronized.

For example, if the storage address of the tensor data to be synchronized is in the shared storage space, the second processor may access the data from the shared storage space. In this case, the descriptor synchronization instruction may include the content of the descriptor of the tensor data to be synchronized. After receiving the descriptor synchronization instruction, the second processor may parse the instruction to obtain the content of the descriptor. According to the content of the descriptor, the second processor may determine the data address of the tensor data to be synchronized and obtain the tensor data to be synchronized from the shared storage space.

By utilizing the above-mentioned data synchronization method provided by the present disclosure, unnecessary data transmission can be avoided, the amount of transmitted tensor data can be reduced, and the synchronization efficiency can be improved.

In some embodiments, the descriptor synchronization instruction includes an address of the content of the descriptor of the tensor data to be synchronized in a storage space of synchronized data. The step S22 may include:

obtaining the content of the descriptor of the tensor data to be synchronized from the storage space of synchronized data according to the address of the content of the descriptor of the tensor data to be synchronized in the storage space of synchronized data; and obtaining the tensor data to be synchronized from the shared storage space according to the content of the descriptor of the tensor data to be synchronized.

For example, after determining the descriptor of the tensor data to be synchronized, the first processor may store the content of the descriptor in the storage space of synchronized data, and generate and send the descriptor synchronization instruction according to the address of the content of the descriptor in the storage space of synchronized data. After receiving the descriptor synchronization instruction, the second processor may parse the instruction to obtain the storage address of the content of the descriptor. According to the storage address, the second processor may obtain the content of the descriptor of the tensor data to be synchronized from the storage space of synchronized data, and then determine the data address of the tensor data to be synchronized according to the content of the descriptor, and obtain the tensor data to be synchronized.

By utilizing the above-mentioned data synchronization method provided by the present disclosure, the amount of data transmitted between processors during synchronization can be further reduced, and synchronization efficiency can be improved.

Figure 3:
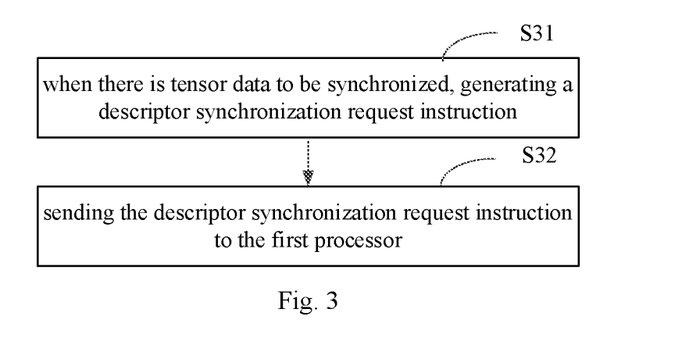
FIG. 3 shows a flowchart of a data synchronization method according to an embodiment of the present disclosure.

FIG. 3 shows a flowchart of a data synchronization method according to an embodiment of the present disclosure. The data synchronization method is applied to the second processor. As shown in FIG. 3, the data synchronization method includes:

in a step S31, when there is tensor data to be synchronized, generating a descriptor synchronization request instruction, where the descriptor synchronization request instruction is used to instruct a first processor to send a descriptor of the tensor data to be synchronized according to the descriptor synchronization request instruction, and the descriptor is used to indicate the shape of the tensor data to be synchronized; and in a step S32, sending the descriptor synchronization request instruction to the first processor.

For example, when there is tensor data to be synchronized in a second processor, the descriptor synchronization request instruction may be sent to the first processor, so as to obtain the tensor data to be synchronized. The second processor may generate the descriptor synchronization request instruction according to the information of the tensor data to be synchronized, such as an identifier of the descriptor indicating the tensor data to be synchronized, and data characteristics of the tensor data to be synchronized. The present disclosure does not limit the specific content of the descriptor synchronization request instruction. According to the information in the descriptor synchronization request instruction, the first processor may determine the descriptor of the tensor data to be synchronized, and then generate the descriptor synchronization instruction.

By utilizing the above-mentioned data synchronization method provided by the present disclosure, a synchronization request may be initiated when synchronization is needed to improve the efficiency of data synchronization.

In some embodiments, the descriptor synchronization request instruction includes an identifier of the descriptor and/or data characteristics of the tensor data to be synchronized, so that the first processor can determine the tensor data to be synchronized. The data characteristics of the tensor data may include information such as the shape, source, and address of the tensor data. Those skilled in the art can set the data characteristics of the tensor data to be synchronized according to the actual situation, which is not limited in the present disclosure.

In some embodiments, the data synchronization method further includes:

parsing the descriptor synchronization instruction received from the first processor to obtain the descriptor of tensor data to be synchronized, where the descriptor synchronization instruction includes the identifier of the descriptor and/or the content of the descriptor; and obtaining the tensor data to be synchronized according to the descriptor of the tensor data to be synchronized.

For example, if descriptors indicating the tensor data have been registered on both the first processor and the second processor, and the identifiers of the descriptors are the same or correspond to each other, the descriptor synchronization request instruction may include the identifiers of the descriptors. For example, when an identifier of a descriptor is TR1, the descriptor synchronization request instruction is represented as Receive TR1. The first processor may parse the descriptor synchronization request instruction received from the second processor to obtain the identifier of the descriptor, and then determine the descriptor of the tensor data to be synchronized according to the identifier of the descriptor, and include it in the descriptor synchronization instruction.

In some embodiments, when receiving the descriptor synchronization instruction, the second processor may parse the descriptor synchronization instruction to obtain the descriptor of the tensor data to be synchronized (the identifier of the descriptor and/or the content of the descriptor). If the descriptor synchronization instruction includes only the identifier of the descriptor, the second processor may internally search for the content of the descriptor corresponding to the identifier of the descriptor, and then obtain the tensor data to be synchronized according to the content of the descriptor.

In some embodiments, if the descriptor synchronization instruction includes the identifier of the descriptor and the content of the descriptor, the second processor may search for the descriptor corresponding to the identifier of the descriptor, and update original content of the descriptor according to the content of the descriptor in the descriptor synchronization instruction. The second processor may further obtain the tensor data to be synchronized according to the updated content of the descriptor.

In some embodiments, if the descriptor synchronization instruction includes the content of the descriptor, the second processor may register a descriptor indicating the tensor data to be synchronized according to the content of the descriptor, and obtain the tensor data to be synchronized according to the content of the descriptor.

By utilizing the above-mentioned data synchronization method provided by the present disclosure, the complexity of data synchronization can be reduced and the efficiency of data synchronization can be improved.

In some embodiments, the descriptor synchronization instruction includes the content of the descriptor of the tensor data to be synchronized. The step of obtaining the tensor data to be synchronized according to the descriptor of the tensor data to be synchronized may include:

obtaining the tensor data to be synchronized from the shared storage space according to the content of the descriptor of the tensor data to be synchronized.

For example, if the storage address of the tensor data to be synchronized is in the shared storage space, the second processor may access the data from the shared storage space. In this case, the descriptor synchronization instruction may include the content of the descriptor of the tensor data to be synchronized. After receiving the descriptor synchronization instruction, the second processor may parse the instruction to obtain the content of the descriptor. According to the content of the descriptor, the second processor may determine the data address of the tensor data to be synchronized and obtain the tensor data to be synchronized from the shared storage space.

By utilizing the above-mentioned data synchronization method provided by the present disclosure, unnecessary data transmission can be avoided, the amount of transmitted tensor data can be reduced, and the synchronization efficiency can be improved.

In some embodiments, the descriptor synchronization instruction includes an address of the content of the descriptor of the tensor data to be synchronized in a storage space of synchronized data. The steps of obtaining the tensor data to be synchronized according to the descriptor of the tensor data to be synchronized may include:

obtaining the content of the descriptor of the tensor data to be synchronized from the storage space of synchronized data according to the address of the content of the descriptor of the tensor data to be synchronized in the storage space of synchronized data; and obtaining the tensor data to be synchronized from the shared storage space according to the content of the descriptor of the tensor data to be synchronized.

After determining the descriptor of the tensor data to be synchronized, the first processor may store the content of the descriptor in the storage space of synchronized data, and generate and send the descriptor synchronization instruction according to the address of the content of the descriptor in the storage space of synchronized data. After receiving the descriptor synchronization instruction, the second processor may parse the instruction to obtain the storage address of the content of the descriptor. According to the storage address, the second processor may obtain the content of the descriptor of the tensor data to be synchronized from the storage space of synchronized data, and then determine the data address of the tensor data to be synchronized according to the content of the descriptor, and obtain the tensor data to be synchronized.

By utilizing the above-mentioned data synchronization method provided by the present disclosure, the amount of data transmitted between processors during synchronization can be further reduced, and synchronization efficiency can be improved.

In some embodiments, the identifier and content of the descriptor can be stored in the descriptor storage space, which may be a storage space in an internal memory of the processor (such as a register, an on-chip SRAM or other medium cache, etc.). Similarly, the data storage space of the tensor data indicated by the descriptor may also be a storage space in an internal memory of the processor (e.g., an on-chip cache) or a storage space in an external memory (an off-chip memory) connected to the processor. The data address of the data storage space may be an actual physical address or a virtual address. The present disclosure does not limit a position of the descriptor storage space and a position of the data storage space, and the type of the data address.

In some embodiments, the identifier of a descriptor, the content of that descriptor, and the tensor data indicated by that descriptor can be located close to each other in the memory. For example, a continuous area of an on-chip cache with addresses ADDR0-ADDR1023 can be used to store the above information. Within that area, storage spaces with addresses ADDR0-ADDR31 can be used to store the identifier of the descriptor, storage spaces with addresses ADDR32-ADDR63 can be used to store the content of the descriptor, and storage spaces with addresses ADDR64-ADDR1023 can be used to store the tensor data indicated by the descriptor. The address ADDR is not limited to 1 bit or 1 byte, and the ADDR is an address unit used to represent an address. Those skilled in the art can determine the storage area and the address thereof according to the specific applications, which is not limited in the present disclosure.

In some embodiments, the identifier, content of the descriptor and the tensor data indicated by the descriptor can be stored in different areas of the memory distant from each other. For example, a register of the memory can be used as the descriptor storage space to store the identifier and content of the descriptor, and an on-chip cache can be used as the data storage space to store the tensor data indicated by the descriptor.

In some embodiments, a special register (SR) may be provided for the descriptor, where the data in the descriptor may be data preprogramed in the descriptor or can be later obtained from the special register for the descriptor. When the register is used to store the identifier and content of the descriptor, a serial number of the register can be used to indicate the identifier of the descriptor. For example, if the serial number of the register is 0, the identifier of the stored descriptor is 0. When the descriptor is stored in the register, an area can be allocated in a caching space (such as creating a tensor cache unit for each tensor data in the cache) according to the size of the tensor data indicated by the descriptor for storing the tensor data. It should be understood that a caching space of a predetermined size may also be used to store the tensor data, which is not limited in the present disclosure.

In some embodiments, the identifier and content of the descriptor can be stored in an internal memory, and the tensor data indicated by the descriptor can be stored in an external memory. For example, on-chip storage of the identifier and content of the descriptor and off-chip storage of the tensor data indicated by the descriptor may be adopted.

In some embodiments, the data address of the data storage space identified by the descriptor may be a fixed address. For example, a separate data storage space may be provided for each tensor data, where start address of each tensor data in the data storage space is identified by the identifier of the descriptor. In this case, the processor can determine the data address of the tensor data according to the identifier of the descriptor.

In some embodiments, when the data address of the data storage space corresponding to the descriptor is a variable address, the descriptor may be also used to indicate the address of N-dimensional tensor data, where the content of the descriptor may further include at least one address parameter representing the address of the tensor data. For example, if the tensor data is a 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+an address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may be different according to the change of the datum point. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of a N-dimensional tensor data includes at least one of the followings: a size of the data storage space of the tensor data in at least one of the N dimensions, a size of the storage area in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is a 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area to which the tensor data is mapped in a 3-dimensional space.

It should be understood that those skilled in the art may select a shape parameter representing tensor data according to actual conditions, which is not limited in the present disclosure.

Figure 4:
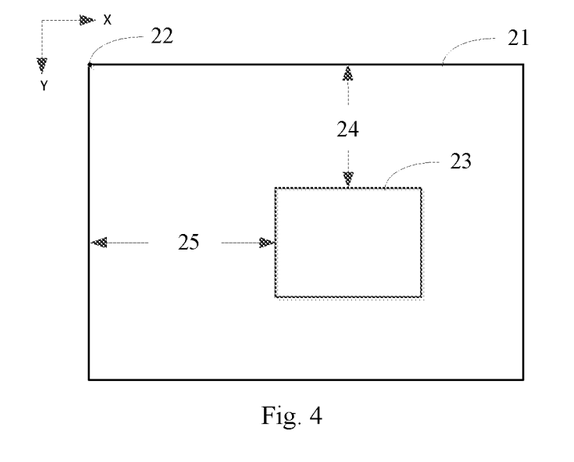
FIG. 4 shows a schematic diagram of a data storage space of a data synchronization method according to an embodiment of the present disclosure.

FIG. 4 shows a schematic diagram of a data storage space of a data synchronization method according to an embodiment of the present disclosure. As shown in FIG. 4, a data storage space 21 stores a 2-dimensional data in a row-first manner. The data storage space 21 can be represented by (x, y), where x is the coordinate of the data storage space in the X axis extending horizontally to the right, and y is the coordinate in the Y axis extending vertically down). A size in the X axis direction (a size of each row) is ori_x (which is not shown in the figure), and a size in the Y axis direction (total count of rows) is ori_y (which is not shown in the figure). A start address PA_start (a base address) of the data storage space 21 is a physical address of a first data block 22. A data block 23 is part of the data in the data storage space 21, where an offset 25 of the data block 23 in the X axis direction is represented as offset_x, an offset 24 of the data block 23 in the Y axis direction is represented as offset_y, the size in the X axis direction is represented as size_x, and the size in the Y axis direction is represented as size_y.

In some embodiments, when the descriptor is used to define the data block 23, the datum point of the descriptor may be a first data block of the data storage space 21, the base address of the descriptor is the start address PA_start of the data storage space 21, and then the content of the descriptor of the data block 23 can be determined according to the size ori_x of the data storage space 21 in the X axis, the size ori_y in the Y axis, the offset offset_y of the data block 23 in the Y axis direction, the offset offset_x of the data block 23 in the X axis direction, the size size_x in the X axis direction, and the size size_y in the Y axis direction.

In some embodiments, the content of the descriptor may be structured as shown by the following formula (1):

$$\begin{cases} X \text{ direction: } \text{ori\_x, offset\_x, size\_x} \\ Y \text{ direction: } \text{ori\_y, offset\_y, size\_y} \\ \qquad \text{PA\_start} \end{cases} \quad (1)$$

It should be understood that although the descriptor describes a 2-dimensional space in the above-mentioned example, those skilled in the art can set the dimensions represented by the content of the descriptor according to actual situations, which is not limited in the present disclosure.

In some embodiments, the content of the descriptor of the tensor data may be determined according to the base address of the datum point of the descriptor in the data storage space and the position of at least two vertices at diagonal positions in N dimensions relative to the datum point.

For example, the content of the descriptor of the data block 23 in FIG. 4 can be determined according to the base address PA_base of the datum point of the descriptor in the data storage space and the position of two vertices at diagonal positions relative to the datum point. First, the datum point of the descriptor and the base address PA_base in the data storage space are determined, for example, a piece of data (for example, a piece of data at position (2, 2)) in the data storage space 21 is selected as a datum point, and a physical address of the selected data in the data storage space is used as the base address PA_base. And then, the positions of at least two vertices at diagonal positions of the data block 23 relative to the datum point are determined, for example, the positions of vertices at diagonal positions from the top left to the bottom right relative to the datum point are used, where the relative position of the top left vertex is (x_min, y_min), and the relative position of the bottom right vertex is (x_max, y_max). And then the content of the descriptor of the data block 23 can be determined according to the base address PA_base, the relative position (x_min, y_min) of the top left vertex, and the relative position (x_max, y_max) of the bottom right vertex.

In some embodiments, the content of the descriptor can be structured as shown by the following formula (2):

$$\begin{cases} X \text{ direction: } \text{x\_min, x\_max} \\ Y \text{ direction: } \text{y\_min, y\_max} \\ \qquad \text{PA\_base} \end{cases} \quad (2)$$

It should be understood that although the top left vertex and the bottom right vertex are used to determine the content of the descriptor in the above-mentioned example, those skilled in the art may set at least two specific vertices according to actual needs, which is not limited in the present disclosure.

In some embodiments, the content of the descriptor of the tensor data can be determined according to the base address of the datum point of the descriptor in the data storage space and a mapping relationship between the data description position of the tensor data indicated by the descriptor and the data address of the tensor data indicated by the descriptor. The mapping relationship between the data description position and the data address can be set according to actual needs. For example, when the tensor data indicated by the descriptor is 3-dimensional spatial data, the function f (x, y, z) can be used to define the mapping relationship between the data description position and the data address.

In some embodiments, the content of the descriptor can also be structured as shown by the following formula (3):

$$\begin{cases} f(x, y, z) \\ \text{PA\_base} \end{cases} \quad (3)$$

It should be understood that those skilled in the art can set the mapping relationship between the data description position and the data address according to actual situations, which is not limited in the present disclosure.

When the content of the descriptor is structured according to formula (1), for any datum point in the tensor data, the data description position is set to (x_q, y_q), and then the data address $PA2_{(x,y)}$ of the data in the data storage space can be determined using the following formula (4):

$$PA2_{(x,y)}=PA\_start+(\text{offset\_}y+y_q-1)*ori\_x+(\text{offset\_}x+x_q) \quad (4)$$

By utilizing the above-mentioned method provided by the present disclosure, the processor may compute the data address of the tensor data indicated by the descriptor in the data storage space according to the content of the descriptor, and then execute processing (data operation, data synchronization, etc.) according to the address, Therefore, the complexity of data access can be reduced, and the processing efficiency of the processor can be improved.

Figure 5:
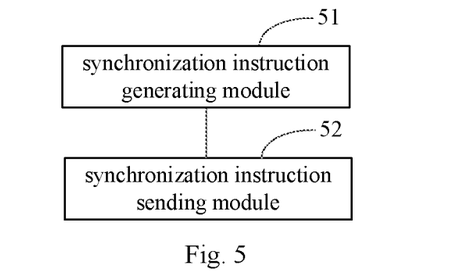
FIG. 5 shows a block diagram of a data synchronization apparatus according to an embodiment of the present disclosure.

FIG. 5 shows a block diagram of a data synchronization apparatus according to an embodiment of the present disclosure. The data synchronization apparatus is implemented on a first processor. As shown in FIG. 5, the data synchronization apparatus may include:

a synchronization instruction generating module 51 configured to generate a descriptor synchronization instruction according to a descriptor of tensor data to be synchronized, where the descriptor synchronization instruction includes an identifier of the descriptor and/or content of the descriptor, and the descriptor is used to indicate a shape of the tensor data to be synchronized; and a synchronization instruction sending module 52 configured to send the descriptor synchronization instruction to a second processor, where the descriptor synchronization instruction is used to instruct the second processor to obtain the tensor data to be synchronized according to the descriptor synchronization instruction.

In some embodiments, the data synchronization apparatus may further include: a first descriptor determining module configured to determine the descriptor of the tensor data to be synchronized according to a descriptor synchronization request instruction received from the second processor.

In some embodiments, the descriptor synchronization request instruction includes the identifier of the descriptor, where the first descriptor determining module includes:

a first parsing sub-module configured to parse the descriptor synchronization request instruction to obtain the identifier of the descriptor; and a first determining sub-module configured to determine the descriptor of the tensor data to be synchronized according to the identifier of the descriptor.

In some embodiments, the descriptor synchronization request instruction includes data characteristics of the tensor data to be synchronized, where the first descriptor determining module includes:

a second parsing sub-module configured to parse the descriptor synchronization request instruction to obtain data characteristics of tensor data to be synchronized; and a second determining sub-module configured to determine the descriptor of the tensor data to be synchronized according to the data characteristics of the tensor data to be synchronized.

In some embodiments, the descriptor synchronization instruction includes the content of the descriptor of the tensor data to be synchronized, where the synchronization instruction generating module includes:

a first generating sub-module configured to generate the descriptor synchronization instruction according to the content of the descriptor of the tensor data to be synchronized when the storage address of the tensor data to be synchronized is in the shared storage space to instruct the second processor to obtain the tensor data to be synchronized from the shared storage space according to the content of the descriptor of the tensor data to be synchronized.

In some embodiments, the synchronization instruction generating module includes:

a first storage sub-module configured to store the content of the descriptor of the tensor data to be synchronized into the storage space of synchronized data; and a second generating sub-module configured to generate the descriptor synchronization instruction according to the address of the content of the descriptor in the storage space of synchronized data to instruct the second processor to obtain the content of the descriptor of the tensor data to be synchronized from the storage space of synchronized data.

In some embodiments, the synchronization instruction generating module includes:

a second storage sub-module configured to store the tensor data to be synchronized to the shared storage space when the storage address of the tensor data to be synchronized is in a non-shared storage space;

a descriptor generating sub-module configured to generate the descriptor of the tensor data to be synchronized according to the address of the tensor data to be synchronized in shared storage space; and a third generating sub-module configured to generate the descriptor synchronization instruction according to the content of the descriptor of the tensor data to be synchronized to instruct the second processor to obtain the tensor data to be synchronized from the shared storage space according to the content of the descriptor of the tensor data to be synchronized.

In some embodiments, the synchronization instruction generating module includes:

a third storage sub-module configured to store the tensor data to be synchronized to the shared storage space when the storage address of the tensor data to be synchronized is in the non-shared storage space;

a descriptor modification sub-module configured to modify the descriptor of the tensor data to be synchronized according to the address of the tensor data to be synchronized in the shared storage space; and a fourth generating sub-module configured to generate the descriptor synchronization instruction according to the content of the descriptor of the tensor data to be synchronized to instruct the second processor to obtain the tensor data to be synchronized from the shared storage space according to the content of the descriptor of the tensor data to be synchronized.

Figure 6:
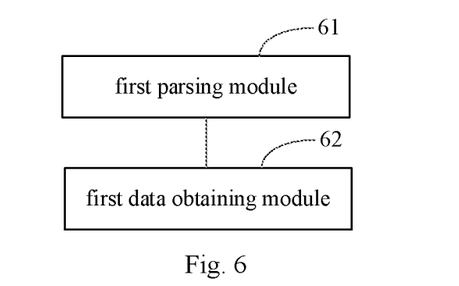
FIG. 6 shows a block diagram of a data synchronization apparatus according to an embodiment of the present disclosure.

FIG. 6 shows a block diagram of a data synchronization apparatus according to an embodiment of the present disclosure. The data synchronization apparatus is implemented on a second processor. As shown in FIG. 6, the data synchronization apparatus includes:

a first parsing module 61 configured to parse a descriptor synchronization instruction received from a first processor to obtain a descriptor of tensor data to be synchronized, where the descriptor synchronization instruction includes an identifier of the descriptor and/or content of the descriptor, and the descriptor is used to indicate a shape of the tensor data to be synchronized; and a first data obtaining module 62 configured to obtain the tensor data to be synchronized according to the descriptor of the tensor data to be synchronized.

In some embodiments, the descriptor synchronization instruction includes the content of the descriptor of the tensor data to be synchronized, where the first data obtaining module includes:

a first data obtaining sub-module configured to obtain the tensor data to be synchronized from a shared storage space according to the content of the descriptor of the tensor data to be synchronized.

In some embodiments, the descriptor synchronization instruction includes an address of the content of the descriptor of the tensor data to be synchronized in a storage space of synchronized data, where the first data obtaining module includes:

a first content obtaining sub-module configured to obtain the content of the descriptor of the tensor data to be synchronized from the storage space of synchronized data according to the address of the content of the descriptor of the tensor data to be synchronized in the storage space of synchronized data; and a second data obtaining sub-module configured to obtain the tensor data to be synchronized from the shared storage space according to the content of the descriptor of the tensor data to be synchronized.

Figure 7:
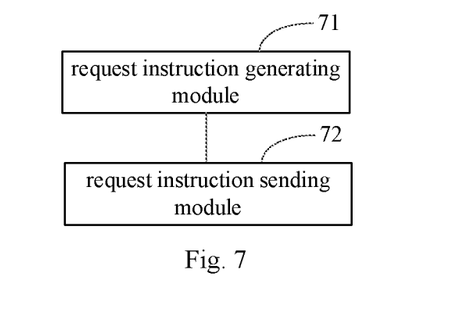
FIG. 7 shows a block diagram of a data synchronization apparatus according to an embodiment of the present disclosure.

FIG. 7 shows a block diagram of a data synchronization apparatus according to an embodiment of the present disclosure. The data synchronization apparatus is implemented on a second processor. As shown in FIG. 7, the data synchronization apparatus includes:

a request instruction generating module 71 configured to generate a descriptor synchronization request instruction when there is tensor data to be synchronized, where the descriptor synchronization request instruction is used to instruct a first processor to send a descriptor of tensor data to be synchronized according to the descriptor synchronization request instruction, and the descriptor is used to indicate a shape of the tensor data to be synchronized; and a request instruction sending module 72 configured to send the descriptor synchronization request instruction to the first processor.

In some embodiments, the descriptor synchronization request instruction includes an identifier of the descriptor and/or data characteristics of the tensor data to be synchronized.

In some embodiments, the data synchronization apparatus includes:

a second parsing module configured to parse the descriptor synchronization instruction received from the first processor to obtain the descriptor of the tensor data to be synchronized, where the descriptor synchronization instruction includes the identifier of the descriptor and/or the content of the descriptor; and a second data obtaining module configured to obtain the tensor data to be synchronized according to the descriptor of the tensor data to be synchronized.

In some embodiments, the descriptor synchronization instruction includes the content of the descriptor of the tensor data to be synchronized, where the second data obtaining module includes:

a third data obtaining sub-module configured to obtain the tensor data to be synchronized from the shared storage space according to the content of the descriptor of the tensor data to be synchronized.

In some embodiments, the descriptor synchronization instruction includes the address of the content of the descriptor of the tensor data to be synchronized in the storage space of synchronized data, where the second data obtaining module includes:

a second content obtaining sub-module configured to obtain the content of the descriptor of the tensor data to be synchronized from the storage space of synchronized data according to the address of the content of the descriptor of the tensor data to be synchronized in the storage space of synchronized data; and a fourth data obtaining sub-module configured to obtain the tensor data to be synchronized from the shared storage space according to the content of the descriptor of the tensor data to be synchronized.

In some embodiments, the present disclosure further provides an artificial intelligence chip including the above-mentioned data synchronization apparatus.

In some embodiments, the present disclosure provides an artificial intelligence chip containing the disclosed first processor, which can be used in conjunction with another artificial intelligence chip containing the disclosed second processor to implement the synchronization method in the present disclosure.

In some embodiments, the present disclosure provides an artificial intelligence chip containing the disclosed first processor and the second processor, which can be used in conjunction with another artificial intelligence chip containing the disclosed first processor and/or the second processor to implement the synchronization method in the present disclosure.

In some embodiments, the present disclosure further provides a board card including a storage device, an interface apparatus, a control device, and the above-mentioned artificial intelligence chip. The artificial intelligence chip is connected to the storage device, the control device, and the interface apparatus, respectively. The storage device is configured to store data. The interface apparatus is configured to implement data transmission between the artificial intelligence chip and an external equipment. The control device is configured to monitor the state of the artificial intelligence chip.

Figure 8:
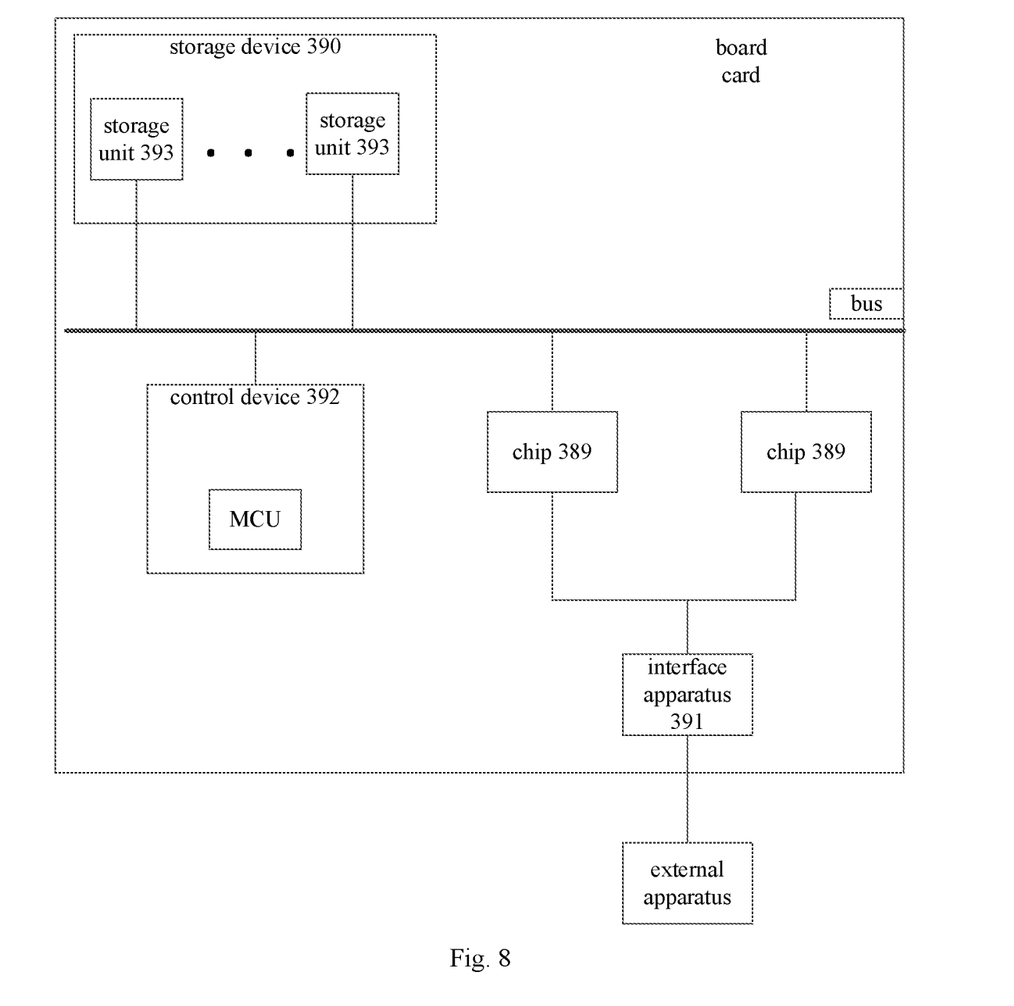
FIG. 8 shows a block diagram of a board card according to an embodiment of the present disclosure.

FIG. 8 shows a structural block diagram of a board card according to an embodiment of the present disclosure. As shown in FIG. 8, in addition to the above-mentioned chip 389, the board card may further include other supporting components, including but not limited to: a storage device 390, an interface apparatus 391, and a control device 392.

The storage device 390 is connected to the neural network chip through a bus, and is configured to store data. The storage device may include a plurality of groups of storage units 393, where each group of the storage units is connected with the neural network chip by the bus. It can be understood that each group of the storage units may be DDR SDRAM (Double Data Rate SDRAM (synchronized dynamic random access memory)).

DDR can double a speed of SDRAM without increasing a clock rate. DDR allows reading data on rising and falling edges of the clock pulse. DDR is twice as fast as standard SDRAM. In an embodiment, the storage device may include 4 groups of the storage unit, where each group of the storage units may include a plurality of DDR4 particles (chips). In an embodiment, the inner part of the neural network chip may include four 72-bit DDR4 controllers, in which 64 bits of the four 72-bit DDR4 controllers are used for data transmission, and 8 bits of the four 72-bit DDR4 controllers are used for ECC check. It can be understood that when DDR4-3200 particles are used in each group of the storage units, the theoretical bandwidth of data transmission can reach 25600 MB/s.

In an embodiment, each group of the storage units may include a plurality of DDR SDRAMs arranged in parallel.

DDR can transmit data twice in one clock cycle. A controller for controlling DDR is provided in the chip, where the controller is used for controlling the data transmission and data storage of each storage unit.

The interface apparatus is electrically connected to the neural network chip, where the interface apparatus is configured to implement data transmission between the neural network chip and an external apparatus (such as a server or a computer). For example, in an embodiment, the interface apparatus may be a standard PCIE interface, and data to be processed is transmitted from the server to the chip through the standard PCIE interface to realize data transmission. Preferably, when a PCIE 3.0×16 interface is used for data transmission, the theoretical bandwidth can reach 16000 MB/s. In another embodiment, the interface apparatus may further include other interfaces. The present disclosure does not limit the specific types of the interfaces, as long as the interface units can implement data transmission. In addition, the computation result of the neural network chip is still transmitted back to an external apparatus (such as a server) by the interface apparatus.

The control device is electrically connected to the neural network chip, where the control device is configured to monitor the state of the neural network chip. Specifically, the neural network chip may be electrically connected to the control device through an SPI interface, where the control device may include an MCU (Micro Controller Unit). The neural network chip may include a plurality of processing chips, a plurality of processing cores, or a plurality of processing circuits, and is capable of driving a plurality of loads. Therefore, the neural network chip can be in different working state such as multi-load state and light-load state. The regulation of the working states of a plurality of processing chips, a plurality of processing cores and or a plurality of processing circuits in the neural network chip can be implemented by the control device.

The embodiments of the present disclosure have been described above, and the above description is exemplary, not exhaustive, and is not limited to the disclosed embodiments. Without departing from the scope and spirit of the described embodiments, many modifications and changes are obvious to those ordinary skilled in the art. The choice of terms used herein is intended to best explain the principles, practical applications, or improvements to technologies in the market of the embodiments, or to enable other ordinary skilled in the art to understand the embodiments disclosed herein.

What is claimed is:

1. A data synchronization method performed by a first processor, comprising:
    generating, by the first processor, a descriptor synchronization instruction for synchronizing tensor data between the first processor and a second processor according to a descriptor of tensor data to be synchronized, wherein the descriptor indicates a shape of the tensor data to be synchronized, and the descriptor synchronization instruction includes an identifier of the descriptor or content of the descriptor; and
    sending the descriptor synchronization instruction to the second processor, wherein the descriptor synchronization instruction is configured to instruct the second processor to obtain the tensor data to be synchronized according to the shape of the tensor data indicated by the descriptor obtainable from the descriptor synchronization instruction.

2. The data synchronization method of claim 1, further comprising:
    determining the descriptor of the tensor data to be synchronized according to a descriptor synchronization request instruction received from the second processor.

3. The data synchronization method of claim 2, wherein the descriptor synchronization request instruction includes the identifier of the descriptor, and the determining the descriptor of the tensor data to be synchronized according to the descriptor synchronization request instruction received from the second processor includes:
    parsing the descriptor synchronization request instruction to obtain the identifier of the descriptor; and
    determining e descriptor of the tensor data to be synchronized according to the identifier of the descriptor.

4. The data synchronization method of claim 2, wherein the descriptor synchronization request instruction includes data characteristics of the tensor data to be synchronized, and the determining the descriptor of the tensor data to be synchronized according to the descriptor synchronization request instruction received from the second processor includes:
    parsing the descriptor synchronization request instruction to obtain the data characteristics of the tensor data to be synchronized, and
    according to the data characteristics of the tensor data to be synchronized, determining the descriptor of the tensor data to be synchronized.

5. The data synchronization method of claim 1, wherein the descriptor synchronization instruction includes the content of the descriptor of the tensor data to be synchronized, and the generating the descriptor synchronization instruction according to the descriptor of tensor data to be synchronized includes:
    determining that a storage address of the tensor data to be synchronized is in a shared storage space; and
    generating the descriptor synchronization instruction according to the content of the descriptor of the tensor data to be synchronized to instruct the second processor to obtain the tensor data to be synchronized from the shared storage space according to the content of the descriptor of the tensor data to be synchronized.

6. The data synchronization method of claim 1, wherein the descriptor synchronization instruction includes the content of the descriptor of the tensor data to be synchronized, and the generating the descriptor synchronization instruction according to the descriptor of the tensor data to be synchronized includes:
    storing the content of the descriptor of the tensor data to be synchronized to a storage space of synchronized data; and
    generating the descriptor synchronization instruction to include an address of the content of the descriptor in the storage space of synchronized data to instruct the second processor to obtain the content of the descriptor of the tensor data to be synchronized from the address in the storage space of synchronized data.

7. The data synchronization method of claim 1, wherein the descriptor synchronization instruction includes the content of the descriptor of the tensor data to be synchronized, and the generating the descriptor synchronization instruction according to the descriptor of the tensor data to be synchronized includes:
    determining that a storage address of the tensor data to be synchronized is in a non-shared storage space;
    storing the tensor data to be synchronized to a shared storage space;

generating the descriptor of the tensor data to be synchronized to include a new address of the tensor data to be synchronized in the shared storage space; and generating the descriptor synchronization instruction according to the content of the descriptor of the tensor data to be synchronized to instruct the second processor to obtain the tensor data to be synchronized from the new address in the shared storage space according to the content of the descriptor of the tensor data to be synchronized.

8. The data synchronization method of claim 1, wherein the generating the descriptor synchronization instruction according to the descriptor of the tensor data to be synchronized includes:

determining that an initial storage address of the tensor data to be synchronized is in a non-shared storage space;

storing the tensor data to be synchronized to a shared storage space;

modifying the descriptor of the tensor data to be synchronized in the non-shared storage space to include a new address of the tensor data to be synchronized in the shared storage space; and generating the descriptor synchronization instruction according to the content of the descriptor of the tensor data to be synchronized to instruct the second processor to obtain the tensor data to be synchronized from the shared storage space according to the content of the descriptor of the tensor data to be synchronized.

9. A data synchronization method performed by a second processor, comprising:

parsing a descriptor synchronization instruction received from a first processor to obtain a descriptor of tensor data to be synchronized between the first processor and the second processor, wherein the descriptor synchronization instruction includes an identifier of the descriptor or content of the descriptor, and the descriptor indicates a shape of the tensor data to be synchronized; and obtaining the tensor data to be synchronized according to the the shape of the tensor data indicated by the descriptor of the tensor data to be synchronized.

10. The data synchronization method of claim 9, wherein the descriptor synchronization instruction includes the content of the descriptor of the tensor data to be synchronized, and the obtaining the tensor data to be synchronized according to the descriptor of the tensor data to be synchronized includes:

obtaining the tensor data to be synchronized from a shared storage space according to the content of the descriptor of the tensor data to be synchronized.

11. The data synchronization method of claim 9, wherein the descriptor synchronization instruction includes an address of the content of the descriptor of the tensor data to be synchronized in a storage space of synchronized data, and the obtaining the tensor data to be synchronized according to the descriptor of the tensor data to be synchronized includes:

obtaining the content of the descriptor of the tensor data to be synchronized from the storage space of synchronized data according to the address of the content of the descriptor of the tensor data to be synchronized in the storage space of synchronized data; and obtaining the tensor data to be synchronized from a shared storage space according to the content of the descriptor of the tensor data to be synchronized.

12. A data synchronization method performed by a second processor, comprising:

determining that there is tensor data to be synchronized between a first processor and the second processor;

generating a descriptor synchronization request instruction, wherein the descriptor synchronization request instruction is used to instruct the first processor to send a descriptor of the tensor data to be synchronized to the second processor according to the descriptor synchronization request instruction, and the descriptor indicates a shape of the tensor data to be synchronized; and sending the descriptor synchronization request instruction to the first processor to request the descriptor of the tensor data to be synchronized.

13. The data synchronization method of claim 12, wherein the descriptor synchronization request instruction includes an identifier of the descriptor or data characteristics of the tensor data to be synchronized.

14. The data synchronization method of claim 13, further comprising:

parsing a descriptor synchronization instruction received from the first processor to obtain the descriptor of tensor data to be synchronized, wherein the descriptor synchronization instruction includes the identifier of the descriptor or content of the descriptor; and obtaining the tensor data to be synchronized according to the descriptor of the tensor data to be synchronized.

15. The data synchronization method of claim 14, wherein the descriptor synchronization instruction includes the content of the descriptor of the tensor data to be synchronized, and the obtaining the tensor data to be synchronized according to the descriptor of the tensor data to be synchronized includes:

obtaining the tensor data to be synchronized from a shared storage space according to the content of the descriptor of the tensor data to be synchronized.

16. The data synchronization method of claim 14, wherein the descriptor synchronization instruction includes an address of the content of the descriptor of the tensor data to be synchronized in a storage space of synchronized data, and the obtaining the tensor data to be synchronized according to the descriptor of the tensor data to be synchronized includes:

obtaining the content of the descriptor of the tensor data to be synchronized from the storage space of synchronized data according to the address of the content of the descriptor of the tensor data to be synchronized in the storage space of synchronized data; and obtaining the tensor data to be synchronized from a shared storage space according to the content of the descriptor of the tensor data to be synchronized.

17. An artificial intelligence chip, comprising:

a first processor configured to generate a descriptor synchronization instruction to synchronize tensor data between the first processor and a second processor according to a descriptor of the tensor data to be synchronized, wherein the descriptor indicates a shape of the tensor data to be synchronized, and the descriptor synchronization instruction includes an identifier of the descriptor or content of the descriptor; and the second processor configured to parse the descriptor synchronization instruction received from the first processor to obtain the descriptor of tensor data to be synchronized and obtain the tensor data to be synchronized according to the shape of the tensor data indicated by the descriptor of the tensor data.

18. The artificial intelligence chip of claim 17, wherein the second processor is further configured to generate a descriptor synchronization request instruction, wherein the descriptor synchronization request instruction is used to instruct the first processor to send the descriptor of the tensor data to be synchronized according to the descriptor synchronization request instruction, wherein the descriptor synchronization request instruction includes the identifier of the descriptor, and the first processor is further configured to parse the descriptor synchronization request instruction received from the second processor to obtain the identifier of the descriptor and determine the descriptor of the tensor data to be synchronized according to the identifier of the descriptor.

19. A board card, comprising:

a storage device configured to store data;

an artificial intelligence chip of 17;

an interface apparatus configured to implement data transmission between the artificial intelligence chip and an external equipment; and a control device configured to monitor state of the artificial intelligence chip.

20. The board card of claim 19, wherein the storage device includes a plurality of groups of storage units, wherein each group of the storage units is connected with the artificial intelligence chip by a bus, and the storage units are DDR SDRAM, the artificial intelligence chip includes a DDR controller configured to control data transmission and data storage of each storage unit, and the interface apparatus is a standard PCIE interface.

* * * * *